United States Patent
Wu (10) Patent No.: US 9,465,703 B2
(45) Date of Patent: Oct. 11, 2016

(54) EDGE VIRTUAL BRIDGING STATION WITH PRIMARY AND SECONDARY PHYSICAL NETWORK CARDS

(71) Applicant: Hangzhou H3C Technologies Co., Ltd., Hangzhou (CN)

(72) Inventor: Qiang Wu, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 14/405,377

(22) PCT Filed: Oct. 31, 2013

(86) PCT No.: PCT/CN2013/086276
§ 371 (c)(1),
(2) Date: Dec. 3, 2014

(87) PCT Pub. No.: WO2014/067468
PCT Pub. Date: May 8, 2014

(65) Prior Publication Data
US 2015/0227443 A1 Aug. 13, 2015

(30) Foreign Application Priority Data
Nov. 1, 2012 (CN) .......................... 2012 1 0431663

(51) Int. Cl.
G06F 11/00 (2006.01)
G06F 11/20 (2006.01)
H04L 12/46 (2006.01)
G06F 13/40 (2006.01)

(52) U.S. Cl.
CPC ....... *G06F 11/2007* (2013.01); *G06F 13/4022* (2013.01); *H04L 12/4625* (2013.01); *G06F 2201/85* (2013.01); *H04L 12/4641* (2013.01)

(58) Field of Classification Search
CPC ........... G06F 11/2007; G06F 13/4022; G06F 2201/85; H04L 12/4625; H04L 12/4641
See application file for complete search history.

(56) References Cited

U.S. PATENT DOCUMENTS

2011/0299402 A1* 12/2011 Vobbilisetty ........ H04L 12/4641
370/241
2011/0299534 A1* 12/2011 Koganti .............. H04L 12/4625
370/392

(Continued)

FOREIGN PATENT DOCUMENTS

| CN | 1556625 | 12/2004 |
| CN | 101488918 | 7/2009 |
| CN | 102413041 | 4/2012 |
| CN | 102647288 | 8/2012 |

(Continued)

OTHER PUBLICATIONS

International Search Report and Written Opinion dated Jan. 30, 2014 issued on PCT Patent Application No. PCT/CN2013/086276 dated Oct. 31, 2013, The State Intellectual Property Office, P.R. China.

(Continued)

*Primary Examiner* — Joshua P Lottich
(74) *Attorney, Agent, or Firm* — Hewlett Packard Enterprise Patent Department (57) ABSTRACT

According to an example, an Edge Virtual Bridging (EVB) station is configured with a VM, an ER and multiple physical network cards. The VM is configured with multiple virtual network cards and each virtual network card has one VSI. Each VSI is connected with one of the physical network cards via the ER. One of the physical network cards is configured as a primary physical network card, and another is configured as a secondary physical network card. A VSI corresponding to the primary physical network card is configured as a primary virtual interface, and a VSI corresponding to the secondary physical network card is configured as a secondary virtual interface. After determining the primary physical network card failed, the secondary physical network card is configured as a new primary physical network card, and the secondary virtual is configured as a new primary virtual interface.

13 Claims, 5 Drawing Sheets

(56) References Cited

U.S. PATENT DOCUMENTS

| | | | |
|---|---|---|---|
| 2011/0317703 A1* | 12/2011 | Dunbar | H04L 12/462 370/392 |
| 2012/0014386 A1 | 1/2012 | Xiong et al. | |
| 2012/0014387 A1* | 1/2012 | Dunbar | H04L 12/4625 370/395.53 |
| 2012/0063306 A1* | 3/2012 | Sultan | H04L 12/4625 370/230 |
| 2015/0172126 A1* | 6/2015 | Xiao | H04L 12/4625 370/254 |
| 2015/0172222 A1* | 6/2015 | Liao | H04L 49/356 370/392 |

FOREIGN PATENT DOCUMENTS

| | | |
|---|---|---|
| CN | 102752215 | 10/2012 |
| WO | WO-2012031569 | 3/2012 |

OTHER PUBLICATIONS

"Edge Virtual Bridge Proposal Version 0, Rev 0.1;bg-joint-evb-0410v1," IEEE Draft, vol. 802.1, No. v1, Apr. 22, 2010, pp. 1-72, XP017643090.

Extended European Search Report, EP Application No. 13851962.4, Date: May 10, 2016, pp. 1-6.

* cited by examiner

| Type (7bits) | Length (9bits) | Reason (1byte) | VSI Type ID (3bytes) | VSI Type Version (1byte) | VSI ID Format (1byte) | VSI ID (16bytes) | Filter Format (1byte) | Filter Info (n bytes) |
|---|---|---|---|---|---|---|---|---|

EDGE VIRTUAL BRIDGING STATION WITH PRIMARY AND SECONDARY PHYSICAL NETWORK CARDS

CLAIM FOR PRIORITY

The present application is a national stage filing under 35 U.S.C 371 of PCT application number PCT/CN2013/086276, having an international filing date of Oct. 31, 2013, which claims priority to Chinese patent application number 201210431663.X having a filing date of Nov. 1, 2012 the disclosure of which are hereby incorporated by reference in their entireties.

BACKGROUND

With the expansion of data center services, virtualization has become popular. Virtualization technologies mainly include network virtualization, storage virtualization and server virtualization. For server virtualization, a physical server can host multiple Virtual Machines (VMs) through specific virtualization management software. Each VM runs independently of each other and each VM has its own operating system, applications and virtual hardware environment. The virtual hardware environment includes a virtual CPU, a virtual memory, a virtual storage device, a virtual IO device, and a virtual switch.

The virtual switch of the VM is mainly used to implement data exchange between the VM and an external network and implement data exchange between the VM and another VM. This kind of switch is called a virtual Ethernet switch. The virtual Ethernet switch may be called vSwitch and implemented via software, or may be implemented via hardware, e.g. by using a network card.

The virtual switch may perform Edge Virtual Bridging (EVB), which is an IEEE standard that facilitates the interaction between virtual switching environments and the first layer of the physical switching infrastructure. The EVB vSwitch can provide inbound/outbound communication and inter-VM communication, and aggregate VM traffic as well as provide frame delivery between VMs based on Media Access Protocol (MAC) addresses. Also, the vSwitch may implement the Virtual Edge Port Aggregator (VEPA) standard. VEPA hands all the network traffic generated by the VM to the physical switch connected to the server hosting the VM for processing. Even the traffic among VMs hosted on the same server is processed on the physical switch and returned to the destination VM on the server. The VEPA realizes traffic forwarding among VMs through the physical switch, and also realizes supervision of the traffic of the VMs.

DETAILED DESCRIPTION

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

Functions of EVB may be implemented by a server and an edge switch collaboratively according to an S-Channel Discovery and Configuration Protocol (CDCP), an Edge Control Protocol (ECP) and a Virtual Switch Interface (VSI) Discovery and Configuration Protocol (VDP). The VDP may be used to detect and configure the VSI, and to have the server negotiate with the edge switch so as to associate a VSI of a VM with an interface of the edge switch. The interface used for receiving and sending data on the VM is the VSI. Therefore, traffic monitoring and flow strategies configuration performed for the VM are to monitor and control the VSI. In EVB technologies, strategies for monitoring and controlling the VSI are stored in a database of a VSI management server. When the VM is established or transferred, the VSI management server is searched for the strategies, and then the strategies are configured on the edge switch directly connected to the VM. Therefore, the VSI interface is associated with the edge switch. In this way, data of the VM may be monitored and controlled by the edge switch located outside the server.

As can be seen from the examples of the embodiments described below, multiple virtual interfaces may be configured on an EVB station, which may include a server hosting VMs, and the number of the multiple virtual interfaces may be the same as the number of multiple physical network cards. One of the multiple virtual interfaces is designated as the primary virtual interface, and the others are designated as secondary virtual interfaces. The multiple virtual interfaces may simulate multiple physical interfaces. When the physical interface is switched because of failure, the virtual interface is also switched, thereby avoiding loss of data. The states of the multiple physical network cards are reflected to the VMs, thereby enhancing functions of the EVB station. Furthermore, support is provided for multiple network cards, and existing EVB technologies may not accommodate multiple network cards.

Figure 1:
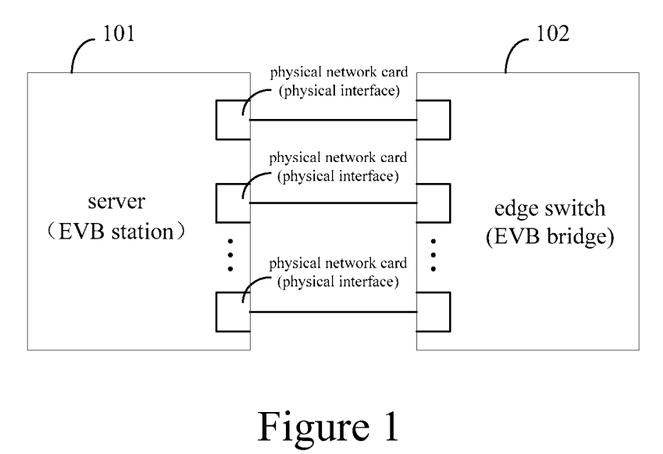
FIG. 1 is a schematic diagram illustrating a structure of an EVB system in accordance with an example of the present disclosure.

FIG. 1 is a schematic diagram illustrating a structure of an EVB system in accordance with an example of the present disclosure. According to various examples, a server in the EVB system is called an EVB station, and an edge switch in the EVB system is called an EVB bridge. As shown in FIG. 1, the EVB system includes EVB station 101 and EVB bridge 102. EVB station 101 is a server with multiple physical network cards, and each physical network card is a physical interface for external network communication. Therefore, EVB station 101 may be connected with EVB bridge 102 via the multiple physical interfaces. The EVB station 101 and other EVB stations described herein may include more than one VM and may have more than one edge router.

Figure 2:
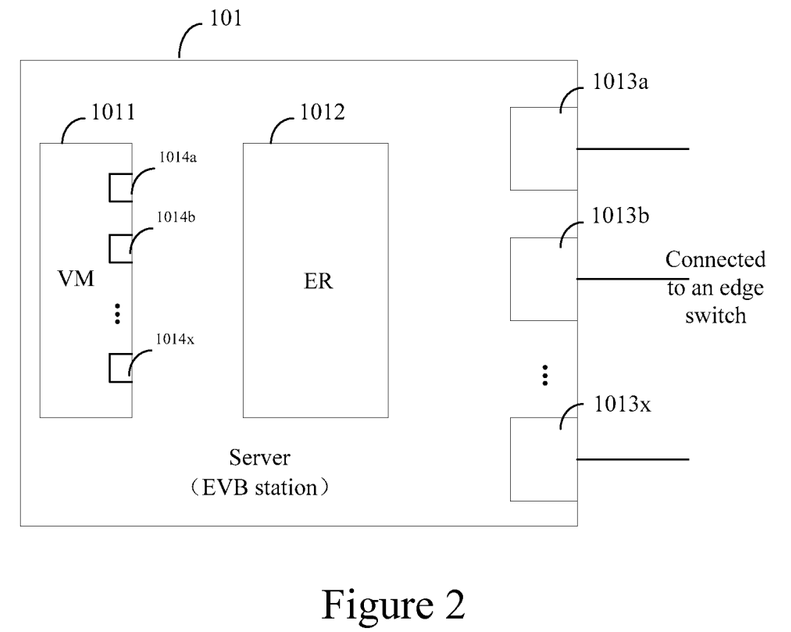
FIG. 2 is a schematic diagram illustrating a structure of EVB station 101 in accordance with an example of the present disclosure.

FIG. 2 is a schematic diagram illustrating a structure of EVB station 101 in accordance with an example of the present disclosure. As shown in FIG. 2, EVB station 101 includes VM 1011, Edge Router (ER) 1012 and multiple physical interfaces 1013 a-x. Each physical interface 1013 a-x corresponds to one physical network card. A physical interface connects the system to a network and may include software (e.g., machine readable instructions) and a connector. The physical network card for example is a network interface card/controller (NIC). VM 1011 is configured with multiple Virtual Switch Interfaces (VSIs) 1014 a-x. In EVB station 101, each of the VSIs 1014 a-x is connected with one of the physical interfaces 1013 a-x via ER 1012. The EVB station 101 may have any number of physical interfaces and the VM 1011 may have any number of VSIs, and the number of VSIs may not equal the number of physical interfaces. One of the multiple physical network cards may be preconfigured as a primary physical network card, and the other physical network cards are secondary physical network cards. The physical interface corresponding to the primary physical network card is a primary physical interface, and the physical interface corresponding to the secondary physical network card is a secondary physical interface. The VSI corresponding to the primary physical network card is configured as a primary virtual interface, and the VSI corresponding to the secondary physical network card is configured as a secondary virtual interface.

When the primary virtual interface of VM 1011 and the primary physical interface of EVB station 101 are both in a working mode, they are both are able to receive and send data. When the secondary virtual interface of VM 1011 and the secondary virtual interface of EVB station 101 are both in a blocking mode, they are unable to receive and send data. ER 1012 may send a VDP association request to EVB bridge 102, shown in FIG. 1, via the primary physical interface, so as to associate the primary virtual interface with the EVB bridge 102. ER 1012 may further send a VDP pre-association request to EVB bridge 102 via the secondary physical interface, so as to pre-associate the secondary virtual interface with the EVB bridge 102. The data of VM 1011 are sent to ER 1012 via the primary virtual interface, and then ER 1012 sends the data to EVB bridge 102 via the primary physical interface.

According to an example, VM 1011 is configured with multiple virtual interfaces 1014 a-x, and the multiple virtual interfaces 1014 a-x correspond to multiple physical interfaces 1013 a-x respectively. The primary virtual interface is associated with EVB bridge 102, and VM data are transferred from the primary physical interface to EVB bridge 102 via the primary virtual interface. EVB bridge 102 monitors and controls the VM data according to strategies. The strategies may include flow monitor and control strategies. The strategies may include filter information that identifies flow characteristics of a VSI to accurately identify the flow transferred from a primary virtual interface according to the flow characteristics. The identified flow can be managed and controlled based on rules in the strategies.

In addition, the secondary virtual interface is pre-associated with EVB bridge 102, and strategies are configured for the secondary virtual interface. The secondary virtual interface may be in a blocking mode and cannot receive or send data, but may receive protocol packets. Therefore, states of the physical network cards are reflected to the VM, and the EVB technologies are consummated.

Further, if the primary physical interface corresponding to the primary physical network card fails, a secondary physical network card corresponding to the secondary physical interface is selected. The selected secondary physical network card is taken as a new primary physical network card, and the secondary physical interface corresponding to the selected secondary physical network card is taken as a new primary physical interface. After the above primary-secondary switch of the physical interfaces is finished, primary-secondary switch of virtual interfaces may be performed. The secondary virtual interface, which may have previously been associated with EVB bridge 102, becomes a new primary virtual interface. Traffic is transferred from the new primary virtual interface to EVB bridge 102 via the new primary physical interface. Therefore, the state change of physical interfaces in the EVB station which has multiple network cards is performed quickly and minimizes loss of data.

Figure 3:
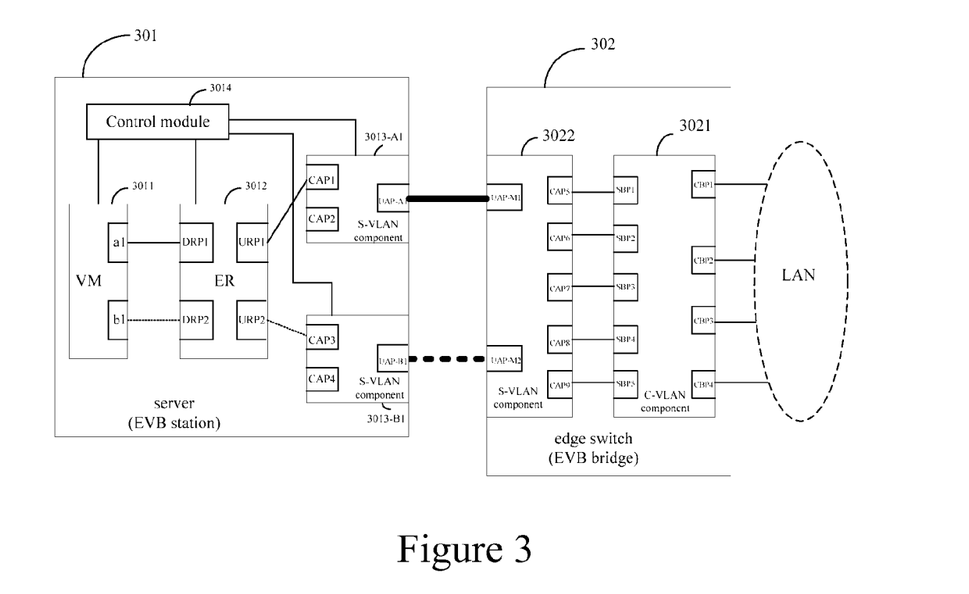
FIG. 3 is a schematic diagram illustrating a structure of an EVB system in accordance with another example of the present disclosure.

FIG. 3 is a schematic diagram illustrating a structure of an EVB system in accordance with another example of the present disclosure. As shown in FIG. 3, EVB station 301 includes VM 3011, ER 3012, a control module 3014, two physical network cards 3013-A1 and 3013-B1. Although not shown, EVB station 301 may include multiple VMs, ERs and physical network cards. According to the example, configurations for the EVB station 301 and EVB bridge 302 are now described.

Two virtual interfaces are configured on VM 3011; one is designated as a primary virtual interface a1, and the other is designated as a secondary virtual interface b1. The primary virtual interface a1 is in a working mode and may send and receive data. The secondary virtual interface b1 is in a blocking mode and cannot send and receive data. If there are more physical interfaces, more virtual interfaces may be configured on VM 3011.

In ER 3012, two Downlink Relay Ports (DRPs), i.e. DRP1 and DRP2, are configured, and two Uplink Relay Ports (URPs), i.e. URP1 and URP2, are configured. DRP1 is a primary downlink port and URP1 is a primary uplink port. DRP1 and UPR1 are both in a working mode. DRP2 is a secondary downlink port and URP2 is a secondary uplink port. DRP2 and URP2 are both in a blocking mode, cannot receive or send data, but may receive protocol packets, e.g. VDP packets. More downlink ports and uplink ports may be configured on ER 3012.

Physical network card 3013-A1 is designated as a primary physical network card and is in a working mode. Physical network card 3013-B1 is designated as a secondary physical network card and is in a blocking mode, and cannot receive and send data but may receive protocol packets, e.g. VDP packets. Each physical interface corresponding to the physical network card has an independent S-VLAN component. The S-VLAN component may send CDCP protocol packets independently and establish an S channel for an ER in an EVB station. S channels are logical multiple channels that may be created on the same physical channel but operate as independent, parallel connections to the external network. If the EVB station 301 does not need or support the S channel, the S channel may not be established. In addition, the S-VLAN component has at least one S-Channel Access Port (CAP) and a single Uplink Access Port (UAP), so as to connect to the EVB bridge 302. The physical network card 3013-A1 includes CAP1, CAP2, and UAP-A1. The physical network card 3013-B1 includes CAP3, CAP4, and UAP-B1.

The control module 3014 configures one of the two physical network cards, e.g. physical network card 3013-A1, as the primary physical network card, and configures the other, e.g. physical network card 3013-B1, as the secondary physical network card. The control module 3014 configures a VSI corresponding to the primary physical network card, e.g. a1, as the primary virtual interface, and configures a VSI corresponding to the secondary physical network card, e.g. b1, as the secondary virtual interface. In addition, the control module 3014 configures the secondary physical network card as a new primary physical network card after the primary physical network card is failed.

According to the above configurations, one VSI of the VM 3011 is connected with one downlink port of the ER, and is connected with the physical interface via one uplink port of the ER. According to an example, the primary virtual interface a1 of VM 3011 is connected with DRP1 of ER 3012; the primary uplink port UPR1 of ER 3012 is connected with CAP1; and UAP-A1 is connected with EVB bridge 302 via an S channel (shown as a solid line), and thus a primary link is established. The secondary virtual interface b1 of VM 3011 is connected with DRP2 of ER 3012; the secondary uplink port UPR2 of ER 3012 is connected with CAP3; and UAP-B1 is connected with EVB bridge 302 via an S channel (shown as a dashed line), and thus a secondary link is established.

According to an example, EVB bridge 302 includes C-VLAN component 3021 connected with a Local Area Network (LAN) and a physical interface 3022. The physical interface 3022 has an independent S-VLAN component. An EVB Bridge may include a single conformant C-VLAN component and one or more S-VLAN components. The S-VLAN component may send CDCP protocol packets independently and establish an S channel for C-VLAN component 3021 in EVB bridge 302. The S-VLAN component has at least one CAP and at least one UAP, so as to connect to EVB station 301. According to the example, The physical network card 3022 includes CAP5~CAP9, UAP-M1 and UAP-M2. The C-VLAN component 3021 has at least one Station-facing Bridge Port (SBP) and at least one C-VLAN Bridge Port (CBP). According to the example, EVB bridge 302 includes SBP1~SBP5, and CBP1~CBP4. EVB bridge 302 may interact with a VSI management server (not shown) in the LAN via CBP1~CBP4, so as to obtain monitoring and controlling strategies from the VSI management server.

Figure 4:
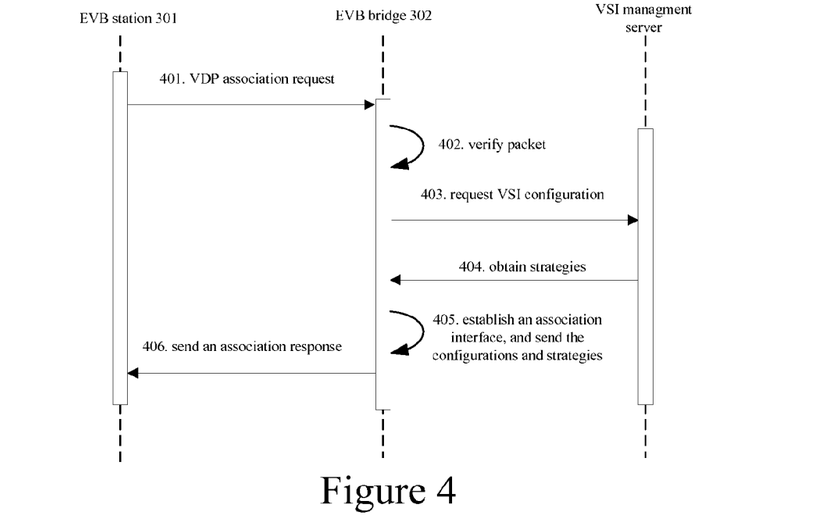
FIG. 4 is a schematic flowchart illustrating a message stream of associating a primary virtual interface a1 of EVB station 301 with EVB bridge 302 in accordance with an example of the present disclosure.

FIG. 4 is a schematic flowchart illustrating a message stream of associating a primary virtual interface a1 of EVB station 301 with EVB bridge 302 in accordance with an example of the present disclosure. FIG. 4 is described with respect to the EVB system shown in FIG. 3 by way of example.

At 401, ER 3012 for EVB station 301 sends an association request. The association request is a VDP protocol packet and is sent to EVB bridge 302 via the physical interface of the primary physical network card 3013-A1. According to an example, the association request is sent by ER 3012 via URP1 and reaches the S-VLAN component via CAP1. The S-VLAN component sends the association request from UAP-A1 to EVB bridge 302 via the primary link.

Figure 5:
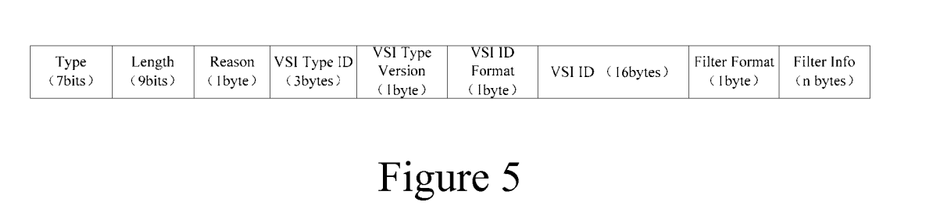
FIG. 5 is a schematic diagram illustrating a Type-Length-Value (TLV) format of a Virtual Switch Interface Discovery and Configuration Protocol (VDP) packet in accordance with an example of the present disclosure.

According to example, the VDP protocol packet may carry information, e.g. an instance ID of the VSI, a type, a version and etc. FIG. 5 is a schematic diagram illustrating a TLV format of a VDP protocol packet sent by EVB station 301. The TLV format includes a Type, a Length, a Reason, a VSI Type ID, a VSI Type Version, a VSI ID Format, a VSI ID, a Filter Format, Filter Info and etc. When the value of the Type is 0x01, it indicates a pre-association request without resources; when the value of Type is 0x02, it indicates a pre-association request with resources; when the value of Type is 0x03, it indicates an association request; and when the value of Type is 0x04, it indicates a de-association request. In the examples of the present disclosure, the pre-association request with resources and the pre-association request without resources are both called a pre-association request.

Referring back to FIG. 4, EVB bridge 302 receives the association request, verifies packet validity at 402, and sends a VSI configuration request to the VSI management server in the LAN to obtain monitoring and controlling strategies at 403. According to an example, EVB bridge 302 receives the association request from UAP-M1 of physical interface 3022. The S-VLAN component sends the association request to the C-VLAN component, and the C-VLAN component requests the VSI management server to provide the strategies. The VSI management server stores monitoring and controlling strategies for each VSI interface in a database VTDB. The VSI management server searches the database according to information, e.g. the VSI ID, the VSI Type ID and the VSI Type Version. After obtaining strategies corresponding to the VSI type of the primary virtual interface a1, the VSI management server sends the obtained strategies to EVB bridge 302 at 404.

At 405, EVB bridge 302 establishes the association interface SBP1 for the primary virtual interface a1, and sends the obtained strategies to the association interface SBP1. According to an example, the C-VLAN component of EVB bridge 302 establishes the association interface SBP1 after obtaining the strategies from the VSI management server. Then the C-VLAN component sends the strategies to the association interface SBP1, so as to associate the primary virtual interface a1 with the association interface SBP1. EVB bridge 302 may configure the obtained strategies as filter information of the VSI. The filter information of the VSI indicates flow characteristics of the VSI. EVB bridge 302 may accurately identify the flow transferred from the primary virtual interface a1 according to the flow characteristics, so as to manage and control the primary virtual interface a1.

At 406, EVB bridge 302 sends an association response to ER 3012. According to an example, the S-VLAN component of EVB bridge 302 sends the association response from UAP-M1 to EVB station 301 via the primary link. The S-VLAN component of EVB station 301 receives the association response from UAP-A1 and sends the association response to ER 3012. According to 401~406, EVB station 301 may associate the primary virtual interface a1 with SBP1 interface of EVB bridge 302.

Figure 6:
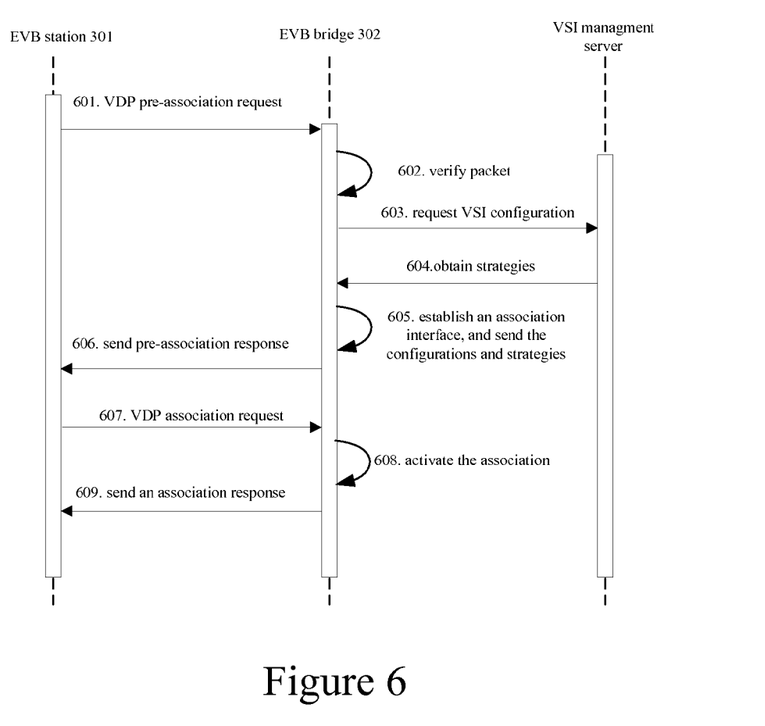
FIG. 6 is a schematic flowchart illustrating a message stream of associating a secondary virtual interface b1 of EVB station 301 with EVB bridge 302 in accordance with an example of the present disclosure.

According to an example, EVB station 301 shown in FIG. 3 may associate the secondary virtual interface b1 with EVB bridge 302. FIG. 6 is a schematic flowchart illustrating a message stream of associating the secondary virtual interface b1 of EVB station 301 with EVB bridge 302 in accordance with an example of the present disclosure. FIG. 6 is described with respect to FIG. 3 by way of example and the process shown in FIG. 6 may be used in other EVB systems. At 601, ER 3012 of EVB station 301 sends a pre-association request. The pre-association request is a VDP protocol packet and is sent to EVB bridge 302 via the physical interface of the secondary physical network card 3013-B1. According to an example, the pre-association request is sent by ER 3012 via URP2 and reaches the S-VLAN component via CAP3. The S-VLAN component sends the pre-association request from UAP-B1 to EVB bridge 302 via the secondary link. The TLV format of the pre-association request is shown in FIG. 5. It should be noted that, the association request at 401 and the pre-association request at 601 carry the same information, e.g. the same VSI ID, the same VSI Type ID, the same Filter Format and the same Filter Info, so that the two virtual interfaces are configured with the same strategies.

At 602, EVB bridge 302 receives the pre-association request, verifies packet validity, and at 603 sends a VSI configuration request to the VSI management server in the LAN to obtain monitoring and controlling strategies. According to an example, EVB bridge 302 receives the pre-association request from UAP-M2 of physical interface 3022. The S-VLAN component sends the pre-association request to the C-VLAN component 3021, and the C-VLAN component 3021 requests the VSI management server to provide the strategies. According to an example, the VSI management server searches the database according to information, e.g. the VSI ID, the VSI Type ID and the VSI Type Version. After obtaining strategies corresponding to the VSI type of the secondary virtual interface b1, the VSI management server sends the obtained strategies to EVB bridge 302 at 604.

At 605, EVB bridge 302 establishes the association interface SBP5 for the secondary virtual interface b1, and sends the obtained strategies to the association interface SBP5. According to an example, the C-VLAN component 3021 of the EVB bridge 302 establishes the association interface SBP5 after obtaining the strategies from the VSI management server. Then the C-VLAN component 3021 sends the strategies to the association interface SBP5, so as to associate the secondary virtual interface b1 with the association interface SBP5.

At 606, EVB bridge 302 sends a pre-association response to ER 3012. According to an example, the S-VLAN component of EVB bridge 302 sends the pre-association response from UAP-M2 to EVB station 301 via the secondary link. The S-VLAN component of EVB station 301 receives the pre-association response from UAP-B1 and sends the association response to ER 3012.

Thus, the primary virtual interface a1 of EVB station 301 is associated with the association interface SBP1 of EVB bridge 302, and the secondary virtual interface b1 is associated with the association interface SBP5 of EVB bridge 302. The strategies are sent to the association interfaces. Specifically, "association" is established at the association interface SBP1 and data may be received and sent, and "pre-association" is established at the association interface SBP5 which is at a ready state, and data may be received and sent when the association request is sent again.

That is, the VM data may reach ER 3012 via the primary virtual interface a1. ER 3012 sends the VM data to the primary physical network card 3013-A1 via URP1. The S-VLAN component of the primary physical interface sends the VM data from UAP-A1 to EVB bridge 302 via the primary link. The S-VLAN component of EVB bridge 302 receives the VM data from UAP-M1 and sends the VM data to C-VLAN component via CAP 5. The C-VLAN component receives the VM data via the association interface SPB1, manages and controls the VM data according to strategies configured in advance.

According to an example, if the primary physical network card 3013-A1 of EVB station 301 fails or the primary link fails, primary-secondary switch may be performed for the physical network cards. The original secondary physical network card 3013-B1 may be designated as a new primary physical network card, and the original primary physical network card 3013-A1 may be designated as a secondary physical network card. In this case, primary-secondary switch are also performed by ER 3012 and VM 3011.

For ER 3012, the original secondary uplink port, i.e. URP2 is designated as a new primary uplink port. ER 3012 sends a VDP association request from the new primary uplink port URP2 to EVB bridge 302 via the new physical network card 3013-B1, so as to associate the new primary virtual interface b1 with EVB bridge 302.

For VM 3011, the virtual interface b1 is designated as a new primary virtual interface and works in a working mode, the virtual interface a1 is designated as a secondary virtual interface and works in a blocking mode. Afterwards, the VM data are transmitted from the new primary virtual interface b1 to ER 3012, and then the VM data are transmitted from the new primary uplink port URP2 to EVB bridge 302 via the new primary physical network card 3013-B1.

ER 3012 may send an association request at 607~609 shown in FIG. 6 to activate the association interface SBP5 in EVB bridge 302. At 607, ER 3012 sends the association request to EVB bridge 302 via the new primary physical network card 3013-B1.

According to an example, the association request is sent by ER 3012 via URP2 which is the new uplink port and reaches the S-VLAN component via CAP3. The S-VLAN component sends the association request from UAP-B1 to EVB bridge 302 via the new primary link.

At 608, EVB bridge 302 receives the association request and activates the association interface SBP5.

According to an example, the strategies are configured on the association interface SBP5, EVB bridge 302 may activate the association interface SBP5 directly, rather than requesting the strategies from the VSI management server again.

If the secondary virtual interface b1 is not associated with EVB bridge 302 before the primary-secondary switch is performed, in this block, EVB bridge 302 receives the association request, verifies packet validity, and sends a VSI configuration request to the VSI management server in the LAN to obtain monitoring and controlling strategies. After obtaining the strategies, EVB bridge 302 establishes the association interface SBP5, and sends the obtained strategies to the association interface SBP5, so as to associate the primary virtual interface b1 with the association interface SBP5.

At 609, EVB bridge 302 sends an association response to ER 3012.

According to an example, the S-VLAN component of EVB bridge 302 sends the association response from UAP-M2 to EVB station 301 via the new primary link. The S-VLAN component of EVB station 301 receives the association response from UAP-B1 and sends the association response to ER 3012. In this way, the association between the new primary virtual interface b1 and the association interface SBP5 is activated. The VM data reaches ER 3012 via the new primary virtual interface b1. ER 3012 sends the VM data to the new primary physical network card 3013-B1 via the primary uplink port URP2. The S-VLAN component of the new primary physical interface 3013-B1 sends the VM data from UAP-B1 to EVB bridge 302 via the new primary link. The S-VLAN component of EVB bridge 302 receives the VM data from UAP-M2 and sends the VM data to C-VLAN component via CAP 9. The C-VLAN component receives the VM data via the association interface SPB5, manages and controls the VM data according to strategies configured in advance.

According to blocks 607~609, the secondary uplink port URP2 is switched as the primary uplink port by ER 3012. According to an example, ER 3012 may send a pre-association request to switch the original primary uplink port URP1 as a secondary uplink port, and the association interface SBP1 in EVB bridge 302 is taken as the pre-association port by using the similar method. If the original primary physical network card 3013-A1 fails and EVB bridge 302 cannot receive the pre-association request, the VM data are still sent to EVB bridge 302 from the new primary physical interface, which does not affect receiving the data.

In addition, if the original primary physical network card 3013-A1 is restored, ER 3012 may perform the primary-secondary switch again. In this way, URP1 is taken as the primary uplink port and URP2 is taken as the secondary uplink port again.

Figure 7:
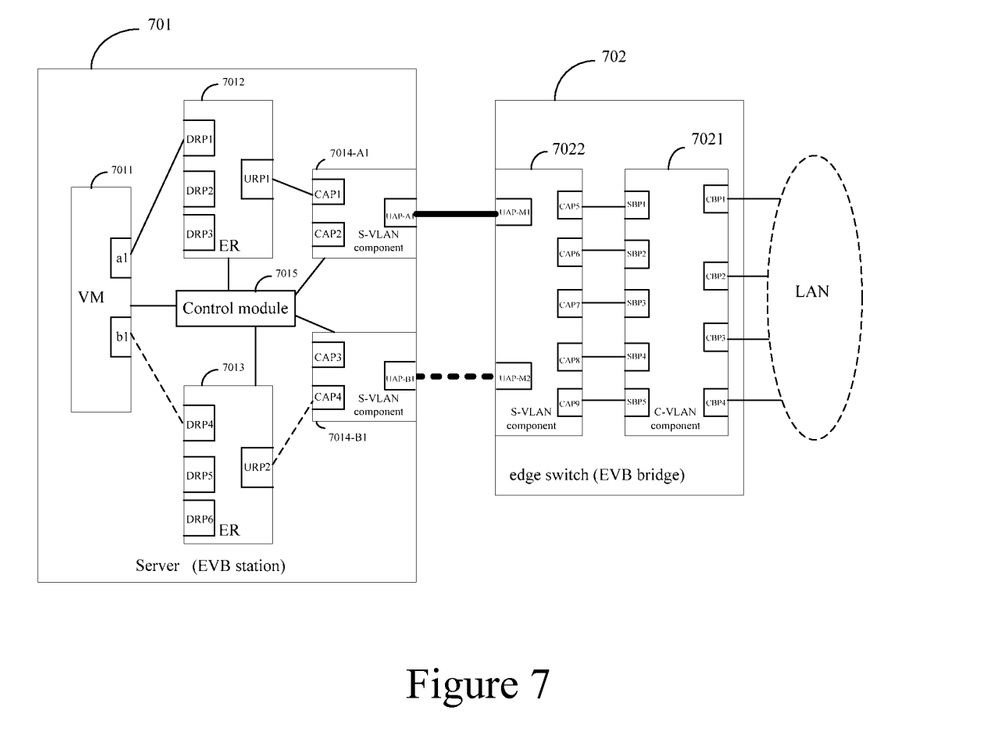
FIG. 7 is a schematic diagram illustrating a structure of an EVB system in accordance with another example of the present disclosure.

FIG. 7 is a schematic diagram illustrating a structure of an EVB system in accordance with another example of the present disclosure. As shown in FIG. 7, EVB station 701 includes VM 7011, a control module 7015, two ERs, i.e. ER 7012 and ER 7013, two physical network cards 7014-A1 and 7014-B1. EVB station 701 may include multiple VMs, ERs and multiple physical network cards, other than shown. According to the example, configurations for the EVB station 701 are now described.

Two virtual interfaces are configured on VM 7011; one is designated as a primary virtual interface a1, and the other is designated as a secondary virtual interface b1. The primary virtual interface a1 is in a working mode and may send and receive data. The secondary virtual interface a1 is in a blocking mode and cannot send and receive data. There may be more than one VM.

In ER 7012, three DRPs, i.e. DRP1~DRP3, are configured, and one URP, i.e. URP1 is configured. In ER 7013, three DRPS, i.e. DRP4~DRP6 are configured and one URP, i.e. URP2 is configured. URP1 is a primary uplink port and is in a working mode. URP2 is a secondary uplink port in a blocking mode, cannot receive or send data, but may receive protocol packets. More downlink ports and uplink ports may be configured on ER 7012.

Physical network card 7014-A1 is designated as a primary physical network card and is in a working mode. Physical network card 7014-B1 is designated as a secondary physical network card and is in a blocking mode, cannot receive and send data but may receive protocol packets, e.g. VDP packets. Each physical interface corresponding to the physical network card has independent S-VLAN component. The S-VLAN component may send CDCP protocol packets independently and establish an S channel for an ER in an EVB station. If the EVB station does not need or support the S channel, the S channel may not be established. In addition, the S-VLAN component has at least one S-Channel Access Port (CAP) and a single Uplink Access Port (UAP), so as to connect with the EVB bridge 702. The physical network card 7014-A1 includes CAP1, CAP2, and UAP-A1. The physical network card 7014-B1 includes CAP3, CAP4, and UAP-B1.

The control module 7015 configures one of the two physical network cards, e.g. physical network card 7014-A1, as the primary physical network card, and configures the other, e.g. physical network card 7014-B1, as the secondary physical network card. The control module 7015 configures a VSI corresponding to the primary physical network card, e.g. a1, as the primary virtual interface, and configures a VSI corresponding to the secondary physical network card, e.g. b1, as the secondary virtual interface. In addition, the control module 7015 configures the secondary physical network card as a new primary physical network card after the primary physical network card is failed.

According to the above configurations, one VSI of the VM is connected with one downlink port of the ER, and is connected with the physical interface via one uplink port of the ER. According to an example, the primary virtual interface a1 of VM 7011 is connected with DRP1 of ER 7012; the primary uplink port UPR1 of ER 7012 is connected with CAP1; and UAP-A1 is connected with EVB bridge 702 via the S channel, and thus a primary link is established. The secondary virtual interface b1 of VM 7011 is connected with DRP4 of ER 7013; the secondary uplink port UPR2 of ER 7012 is connected with CAP4; and UAP-B1 is connected with EVB bridge 702 via the S channel, and thus a secondary link is established. The EVB bridge 702 is similar with EVB bridge 302 and thus is not further described.

Figure 8:
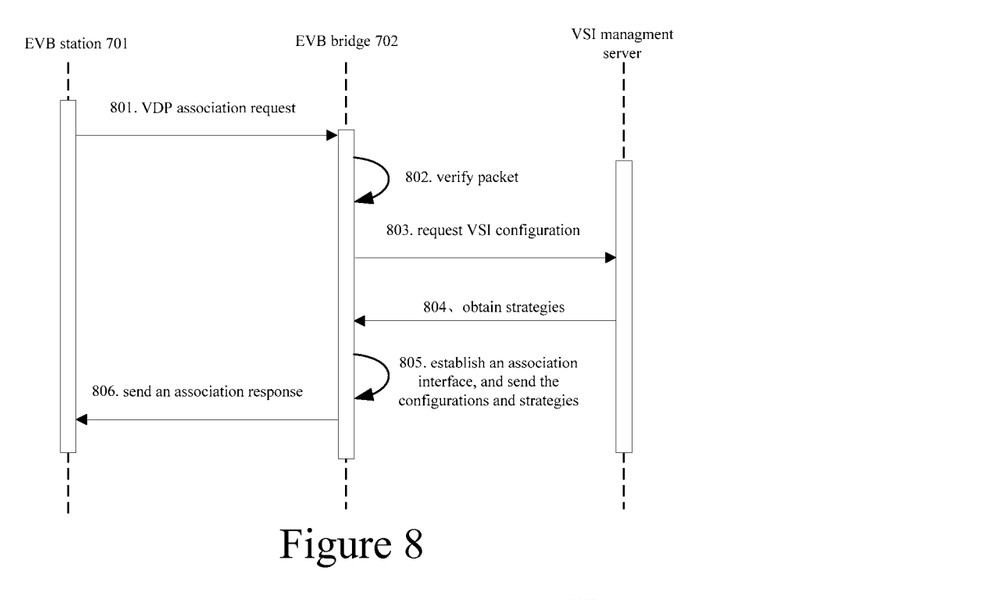
FIG. 8 is a schematic flowchart illustrating a message stream of associating a primary virtual interface a1 of a server 701 with an edge switch 702 in accordance with an example of the present disclosure.

FIG. 8 is a schematic flowchart illustrating a message stream of associating a primary virtual interface a1 of EVB station 701 with EVB bridge 702 in accordance with an example of the present disclosure. FIG. 8 is described by way of example with respect to FIG. 7.

At 801, ER 7012 sends an association request. The association request is a VDP protocol packet and is sent to EVB bridge 702 via the primary physical network card 7014-A1.

According to an example, the association request is sent by ER 7012 of EVB station 701 via URP1 and reaches the S-VLAN component via CAP1. The S-VLAN component sends the association request from UAP-A1 to EVB bridge 702 via the primary link. The VDP protocol packet may carry information, e.g. an instance ID of the VSI, a type, a version, etc. The TLV format is shown in FIG. 5.

At 802, EVB bridge 702 receives the association request, and verifies packet validity, and at 803 sends a VSI configuration request to the VSI management server in the LAN to obtain monitoring and controlling strategies.

According to an example, EVB bridge 702 receives the association request from UAP-M1 of physical interface 7022. The S-VLAN component sends the association request to the C-VLAN component, and the C-VLAN component requests the VSI management server to provide the strategies. The VSI management server searches the database according to information, e.g. the VSI ID, the VSI Type ID and the VSI Type Version. After obtaining strategies corresponding to the VSI type of the primary virtual interface a1, the VSI management server sends the obtained strategies to EVB bridge 702 at 804.

At 805, EVB bridge 702 establishes an association interface SBP1 for the primary virtual interface a1, and sends the obtained strategies to the association interface SBP1. According to an example, the C-VLAN component of EVB bridge 702 establishes the association interface SBP1 after obtaining the strategies from the VSI management server. Then the C-VLAN component sends the strategies to the association interface SBP1, so as to associate the primary virtual interface a1 with the association interface SBP1.

At 806, EVB bridge 702 sends an association response to ER 7012. According to an example, the S-VLAN component of EVB bridge 702 sends the association response from UAP-M1 to the EVB station 701 via the primary link. The S-VLAN component of EVB station 701 receives the association response from UAP-A1 and sends the association response to ER 7012.

Figure 9:
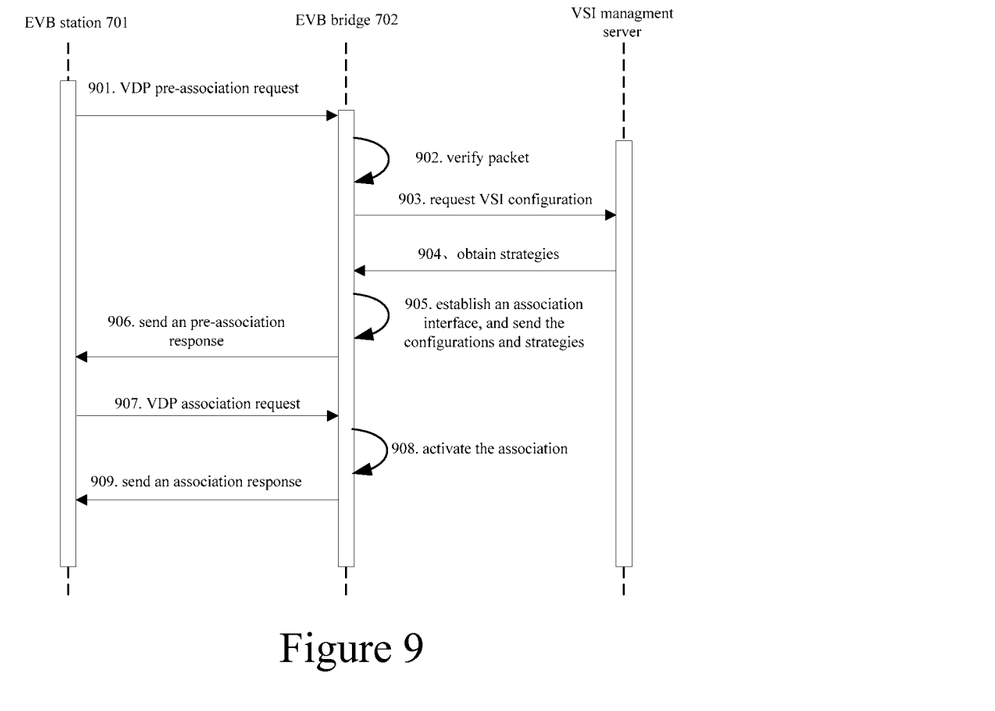
FIG. 9 is a schematic flowchart illustrating a message stream of associating a secondary virtual interface b1 of a server 701 with an edge switch 702 in accordance with an example of the present disclosure.

At 801~806, EVB station 701 may associate the primary virtual interface a1 with SBP1 interface of EVB bridge 702. According to an example, EVB station 701 may associate the secondary virtual interface b1 with EVB bridge 702. FIG. 9 is a schematic flowchart illustrating a message stream of associating a secondary virtual interface b1 of EVB station 701 with EVB bridge 702 in accordance with an example of the present disclosure.

At 901, ER 9013 sends a pre-association request. The pre-association request is a VDP protocol packet and is sent to EVB bridge 702 via the physical interface of the secondary physical network card 7013-B1. According to an example, the pre-association request is sent by ER 7013 via URP2 and reaches the S-VLAN component via CAP4. The S-VLAN component sends the pre-association request from UAP-B1 to EVB bridge 702 via the secondary link. The TLV format of the pre-association request is shown in FIG. 5. It should be noted that, the association request at 801 and the pre-association request at 901 may carry the same information, e.g. the same VSI ID, the same VSI Type ID, the same Filter Format and the same Filter Info, so that the two virtual interfaces are configured with the same strategies.

At 902, EVB bridge 702 receives the pre-association request, and verifies packet validity, and at 903 sends a VSI configuration request to the VSI management server in the LAN to obtain monitoring and controlling strategies. According to an example, EVB bridge 702 receives the pre-association request from UAP-M2 of physical interface 7022. The S-VLAN component sends the pre-association request to the C-VLAN component, and the C-VLAN component requests the VSI management server to provide the strategies. According to an example, the VSI management server searches the database according to information, e.g. the VSI ID, the VSI Type ID and the VSI Type Version. After obtaining strategies corresponding to the VSI type of the secondary virtual interface b1, the VSI management server sends the obtained strategies to EVB bridge 702 at 904.

At 905, EVB bridge 702 establishes an association interface SBP3 for the secondary virtual interface b1, and sends the obtained strategies to the association interface SBP3. According to an example, the C-VLAN component of the EVB bridge 702 establishes the association interface SBP3 after obtaining the strategies from the VSI management server. Then the C-VLAN component sends the strategies to the association interface SBP3, so as to associate the secondary virtual interface b1 with the association interface SBP3.

At 906, EVB bridge 702 sends a pre-association response to ER 7013. According to an example, the S-VLAN component of EVB bridge 702 sends the pre-association response from UAP-M2 to EVB station 701 via the secondary link. The S-VLAN component of EVB station 701 receives the pre-association response from UAP-B1 and sends the association response to ER 7013.

Thus, the primary virtual interface a1 of EVB station 701 is associated with the association interface SBP1 of EVB bridge 702, and the secondary virtual interface b1 is associated with the association interface SBP3 of EVB bridge 702. The strategies are sent to the association interfaces. Specifically, "association" is established at the association interface SBP1 and "pre-association" is established at the association interface SBP3.

That is, the VM data may reach ER 7012 via the primary virtual interface a1. ER 7012 sends the VM data to the primary physical network card 7014-A1 via URP1. The S-VLAN component of the primary physical interface sends the VM data from UAP-A1 to EVB bridge 702 via the primary link. The S-VLAN component of EVB bridge 702 receives the VM data from UAP-M1 and sends the VM data to C-VLAN component via CAP 5. The C-VLAN component receives the VM data via the association interface SPB1, manages and controls the VM data according to strategies configured in advance.

According to an example, if the primary physical network card 7014-A1 of EVB station 701 is failed or the primary link is failed, primary-secondary switch may be performed for the physical network cards. The original secondary physical network card 7014-B1 may be designated as a new primary physical network card, and the original primary physical network card 7014-A1 may be designated as a secondary physical network card. In this case, primary-secondary switch are also performed by ER 7012, ER 7013 and VM 7011.

For VM 7011, the virtual interface b1 is designated as a new primary virtual interface and works in a working mode, the virtual interface a1 is designated as a secondary virtual interface and works in a blocking mode.

For ER 7013, the original secondary uplink port, i.e. URP2 is designated as a new primary uplink port. ER 7013 sends a VDP association request from the new primary uplink port URP2 to EVB bridge 702 via the new physical network card 7014-B1, so as to associate the new primary virtual interface b1 with EVB bridge 702.

Afterwards, the VM data are transmitted from the new primary virtual interface b1 to ER 7012, and then the VM data are transmitted from the new primary uplink port URP2 to EVB bridge 702 via the new primary physical network card 7014-B1.

ER 7013 may send an association request at 907~909 to activate the association interface SBP3 in EVB bridge 702. At 907, ER 7013 sends the association request to EVB bridge 702 via the new primary physical network card 7014-B1. According to an example, the association request is sent by ER 7013 via URP2 which is the new uplink port and reaches the S-VLAN component via CAP4. The S-VLAN component sends the association request from UAP-B1 to EVB bridge 702 via the new primary link.

At 908, EVB bridge 702 receives the association request and activates the association interface SBP3. According to an example, the strategies are configured on the association interface SBP3, EVB bridge 702 may activate the association interface SBP3 directly, rather than requesting the strategies from the VSI management server again.

If the secondary virtual interface b1 is not associated with EVB bridge 702 before the primary-secondary switch is performed, EVB bridge 702 receives the association request, verifies packet validity, and sends a VSI configuration request to the VSI management server in the LAN to obtain monitoring and controlling strategies. After obtaining the strategies, EVB bridge 702 establishes the association interface SBP3, and sends the obtained strategies to the association interface SBP3, so as to associate the primary virtual interface b1 with the association interface SBP3.

At 909, EVB bridge 702 sends an association response to ER 7013. According to an example, the S-VLAN component of EVB bridge 702 sends the association response from UAP-M2 to EVB station 701 via the new primary link. The S-VLAN component of EVB station 701 receives the association response from UAP-B1 and sends the association response to ER 7012.

In this way, the association between the new primary virtual interface b1 and the association interface SBP3 is activated. The VM data reaches ER 7013 via the new primary virtual interface b1. ER 7013 sends the VM data c to the new primary physical network card 7014-B1 via the primary uplink port URP2. The S-VLAN component of the new primary physical interface 7014-B1 sends the VM data from UAP-B1 to EVB bridge 702 via the new primary link. The S-VLAN component of EVB bridge 702 receives the VM data from UAP-M2 and sends the VM data to C-VLAN component via CAP 9. The C-VLAN component receives the VM data via the association interface SPB3, manages and controls the VM data according to strategies configured in advance.

According to 907~909, the secondary uplink port URP2 is switched as the primary uplink port by ER 7012. According to an example, ER 7012 may send a pre-association request to switch the original primary uplink port URP1 as a secondary uplink port, and the association interface SBP1 in EVB bridge 702 is taken as the pre-association port by using the similar method. If the original primary physical network card 7014-A1 is failed and EVB bridge 702 cannot receive the pre-association request, the VM data are still sent to EVB bridge 702 from the new primary physical interface, which does not affect receiving the data.

In addition, if the original primary physical network card 7014-A1 is restored, ER 7012 may perform the primary-secondary switch again. In this way, URP1 is taken as the primary uplink port and URP2 is taken as the secondary uplink port again.

What has been described and illustrated herein are examples of embodiments of the disclosure. The terms, descriptions and figures used herein are set forth by way of illustration only and are not meant as limitations. Many variations are possible within the spirit and scope of the disclosure, which is intended to be defined by the following claims and their equivalents in which all terms are meant in their broadest reasonable sense unless otherwise indicated.

What is claimed is:

1. A method for implementing an Edge Virtual Bridging (EVB) station, the EVB station being configured with a Virtual Machine (VM), an Edge Router (ER), one primary physical network card and at least one secondary physical network card, the VM being configured with multiple virtual network cards, each virtual network card having a Virtual Switch Interface (VSI), and each VSI being connected with the primary physical network card or the at least one secondary physical network card via the ER, the method comprising:

establishing an association relationship between a primary virtual interface and an EVB bridge, the primary virtual interface being a VSI connected to the primary physical network card; establishing a pre-association relationship between a secondary virtual interface and the EVB bridge, the secondary virtual interface being a VSI connected to the secondary physical network card;

receiving data sent by the VM via the primary virtual interface;

sending the data to the EVB bridge via the primary physical network card;

in response to determining the primary physical network card failed, configuring the secondary physical network card as a new primary physical network card, updating the pre-association relationship between the secondary virtual interface and the EVB bridge as an association relationship, configuring the secondary virtual interface as a new primary virtual interface;

receiving new data sent by the VM via the new primary virtual interface; and sending the new data to the EVB bridge via the new primary physical network card.

2. The method of claim 1, wherein establishing the association relationship between the primary virtual interface and the EVB bridge, and establishing the pre-association relationship between the secondary virtual interface and the EVB bridge comprises:

sending a Virtual Switch Interface Discovery and Configuration Protocol (VDP) association request to the EVB bridge via the primary physical network card to establish the association relationship between the primary virtual interface and the EVB bridge; and sending a VDP pre-association request to the EVB bridge via the secondary physical network card to establish the pre-association relationship between the secondary virtual interface and the EVB bridge, wherein the VDP association request and the VDP pre-association request include a same VSI ID, VSI type ID, and filter format.

3. The method of claim 1, wherein the ER is the only ER in the EVB station, and the ER is configured with multiple uplink ports and multiple downlink ports; and each VSI is connected with one downlink port of the ER and is connected with the physical network card of the VSI via one uplink port of the ER; and the primary virtual interface and the primary physical network card correspond to a primary uplink port of the ER, and the secondary virtual interface and the secondary physical network card correspond to a secondary uplink port of the ER.

4. The method of claim 3, updating the pre-association relationship between the secondary virtual interface and the EVB bridge as the association relationship, wherein the updating comprises:

the ER sending a VDP association request to the EVB bridge via the secondary physical network card to establish the association relationship between the secondary virtual interface and the EVB bridge, and the ER configuring the secondary virtual interface as a new primary virtual interface.

5. The method of claim 1, wherein the EVB station is configured with multiple ERs, and each ER is configured with at least one uplink port and at least one downlink port; and each VSI is connected with a downlink port of one of the multiple ERs and is connected with the physical network card of the VSI via an uplink port of the one ER; and the primary virtual interface and the primary physical network card correspond to a primary ER of the multiple ERs, and the secondary virtual interface and the secondary physical network card correspond to a secondary ER of the multiple ERs.

6. The method of claim 5, wherein updating the pre-association relationship between the secondary virtual interface and the EVB bridge as the association relationship comprises:

in response to determining the primary physical network card failed, configuring the secondary ER as a new primary ER; and the new primary ER sending a VDP association request to the EVB bridge via the secondary physical network card to establish the association relationship between the secondary virtual interface and the EVB bridge, and the new primary ER configuring the secondary virtual interface as a new primary virtual interface.

7. An Edge Virtual Bridging (EVB) station, comprising:
a Virtual Machine (VM);
an Edge Router (ER);
one primary physical network card; and
at least one secondary physical network card;
wherein the VM is configured with multiple virtual network cards, each virtual network card having one Virtual Switch Interface (VSI), and each VSI being connected with the primary physical network card or the at least one secondary physical network card via the ER; the EVB station further comprising a control module, wherein
the control module is to configure one secondary physical network card as a new primary physical network card in response to determining the primary physical network card failed; and
the ER is to establish an association relationship between a primary virtual interface and an EVB bridge, the primary virtual interface being a VSI connected to the primary physical network card; establish a pre-association relationship between a secondary virtual interface and the EVB bridge, the secondary virtual interface being a VSI connected to the secondary physical network card; receive data sent by the VM via the primary virtual interface, and send the data to the EVB bridge via the primary physical network card; and
in response to determining the primary physical network card failed, the ER is to update the pre-association relationship between the secondary virtual interface and the EVB bridge as an association relationship, configure the secondary virtual as a new primary virtual interface, receive new data sent by the VM via the new primary virtual interface, and send the new data to the EVB bridge via the new primary physical network card.

8. The EVB station of claim 7, wherein
the ER is further to send a Virtual Switch Interface Discovery and Configuration Protocol (VDP) association request to the EVB bridge via the primary physical network card to establish the association relationship between the primary physical interface and the EVB bridge; and send a VDP pre-association request to the EVB bridge via the secondary physical network card to establish the pre-association between the secondary virtual interface and the EVB bridge, wherein the VDP association request and the VDP pre-association request include the same VSI ID, VSI type ID, and filter format.

9. The EVB station of claim 7, wherein the ER is the only ER in the EVB station, and the ER is configured with multiple uplink ports and multiple downlink ports;
each VSI is connected with one downlink port of the ER and is connected with the physical network card of the VSI via one uplink port of the ER; and
the primary virtual interface and the primary physical network card correspond to a primary uplink port of the ER, and the secondary virtual interface and the secondary physical network card correspond to a secondary uplink port of the ER.

10. The EVB station of claim 9, wherein
after determining the primary physical network card failed, the ER is to send a VDP association request to the EVB bridge via the secondary physical network card to establish the association relationship between the secondary virtual interface and the EVB bridge, and to configure the secondary virtual interface as a new primary virtual interface.

11. The EVB station of claim 7, wherein the EVB station is configured with multiple ERs, and each ER is configured with at least one uplink port and at least one downlink port; and
each VSI is connected with a downlink port of one of the multiple ERs and is connected with the physical network card of the VSI via an uplink port of the one ER; and
the primary virtual interface and the primary physical network card correspond to a primary ER of the multiple ERs, and the secondary virtual interface and the secondary physical network card correspond to a secondary ER of the multiple ERs.

12. The EVB station of claim 11, wherein
after determining the primary physical network card failed, the control module is further to configure the secondary ER as a new primary ER; and
the secondary ER is further to, after being configured as the new primary ER, send a VDP association request to the EVB bridge via the secondary physical network card to establish the association relationship between the secondary virtual interface and the EVB bridge, and to configure the secondary virtual interface as a new primary virtual interface.

13. An Edge Router (ER) of an Edge Virtual Bridging (EVB) station, the EVB station being configured with a Virtual Machine (VM), a primary physical network card and a secondary physical network card, the VM being configured with multiple virtual network cards, each virtual network card having a Virtual Switch Interface (VSI), and each VSI being connected with the primary physical network card or the secondary physical network card via the ER, the ER to:
establish an association relationship between a primary virtual interface and an EVB bridge, the primary virtual interface being a VSI connected to the primary physical network card;
establish a pre-association relationship between a secondary virtual interface and the EVB bridge, the secondary virtual interface being a VSI connected to the secondary physical network card;
receive data sent by the VM via the primary virtual interface, and send the data to the EVB bridge via the primary physical network card; and
in response to determining the primary physical network card failed, update the pre-association relationship between the secondary virtual interface and the EVB bridge as an association relationship, configure the secondary virtual as a new primary virtual interface, receive new data sent by the VM via the new primary virtual interface, and send the new data to the EVB bridge via the secondary physical network card.

* * * * *